United States Patent

Belser et al.

[11] Patent Number: 5,889,641
[45] Date of Patent: Mar. 30, 1999

[54] MAGNETO-RESISTIVE MAGNETO-OPTICAL HEAD

[75] Inventors: Karl A. Belser, San Jose; Terry McDaniel; Joseph E. Davis, both of Morgan Hill; Jerry E. Hurst, Jr., San Jose, all of Calif.

[73] Assignee: Seagate Technology, Inc., Scotts Valley, Calif.

[21] Appl. No.: 851,382

[22] Filed: May 5, 1997

[51] Int. Cl.$^6$ ............................ G11B 5/127; G11B 5/596
[52] U.S. Cl. ......................................... 360/113; 360/77.03
[58] Field of Search ................................ 360/113, 77.03

[56] References Cited

U.S. PATENT DOCUMENTS

| | | | |
|---|---|---|---|
| 4,228,473 | 10/1980 | Himuro et al. | 360/114 |
| 4,581,529 | 4/1986 | Gordon | 250/227 |
| 4,633,450 | 12/1986 | Gueugnon | 369/13 |
| 4,893,207 | 1/1990 | Maury et al. | 360/114 |
| 4,945,400 | 7/1990 | Blonder et al. | 357/74 |
| 5,124,961 | 6/1992 | Yamaguchi et al. | 369/13 |
| 5,152,597 | 10/1992 | Barnard | 359/130 |
| 5,199,090 | 3/1993 | Bell | 385/33 |
| 5,237,548 | 8/1993 | Muchnik | 369/13 |
| 5,296,988 | 3/1994 | Fujino | 360/110 |
| 5,325,116 | 6/1994 | Sampsell | 346/108 |
| 5,325,244 | 6/1994 | Takano et al. | 360/77.03 |
| 5,536,926 | 7/1996 | Ikeda et al. | 235/462 |
| 5,614,714 | 3/1997 | Shaffer | 250/334 |
| 5,625,483 | 4/1997 | Swartz | 359/224 |
| 5,691,865 | 11/1997 | Johnson et al. | 360/113 |
| 5,729,411 | 3/1998 | Kishi et al. | 360/113 |
| 5,737,302 | 4/1998 | Kasahara | 369/118 |
| 5,742,419 | 4/1998 | Dickensheets et al. | 359/201 |

FOREIGN PATENT DOCUMENTS

| | | |
|---|---|---|
| 0331331A2 | 9/1989 | European Pat. Off. . |
| 0460890A2 | 12/1991 | European Pat. Off. . |
| 0614101A2 | 9/1994 | European Pat. Off. . |
| 0650133A2 | 4/1995 | European Pat. Off. . |
| 0712121A2 | 5/1996 | European Pat. Off. . |
| 712121A3 | 12/1996 | European Pat. Off. . |
| 59-117180 | 6/1984 | Japan . |
| 2016744 | 3/1979 | United Kingdom . |
| WO95/13638 | 5/1995 | WIPO . |

OTHER PUBLICATIONS

Daneman, et al. "Laser–to–Fiber Coupling Module Using a Micromachined Alignment Mirror", IEEE Photonics Technology Letters, vol. 8, No. 3, Mar. 1996, pp. 396–398.

Boysel, et al., "Integration of Deformable Mirror Devices with Optical Fibers and Waveguides", SPIE vol. 1793, Integrated Optics and Microstructures (1992), pp. 34–39.

Primary Examiner—John H. Wolff
Attorney, Agent, or Firm—Flehr Hohbach Test Albritton & Herbert LLP

[57] ABSTRACT

An assembly for accessing data bits in storage locations on a succession of radially separated tracks on a rotating multilayer MSR disc comprising a storage layer and a readout layer in combination with a slider flyable over a surface of the disc with the slider supporting at least one optical element coupled to the assembly, the optical element directing light to a region of the disc including one or more storage locations, with the optical element comprising an optical fiber and a micro-machined mirror supported on the slider and adapted to direct the light to storage locations on the recording layer of the disc, a conductive coil is coupled to and supported on the assembly, a passage of current through the conductor coil is sufficient to establish a magnetic field which is coupled to the disc and in cooperation with the light stores information at one of the storage locations on the storage layer, and a magneto-resistive element is coupled to the assembly, the magneto-resistive element cooperates with the light which illuminates and heats a plurality of the storage regions of the disc along one track of the disc, the magneto-resistive element senses one of the bits from the readout layer at the storage location.

13 Claims, 8 Drawing Sheets

MAGNETO-RESISTIVE MAGNETO-OPTICAL HEAD

FIELD OF THE INVENTION

The present invention relates to heads for use in data storage and retrieval systems.

BACKGROUND ART

Magneto-resistive elements are well known in the art for use in magnetic disk drives. Recent advances in magnetic recording technology have provided magnetic heads using giant magneto-resistive (GMR) technology; see, for example, "Giant Magnetoresistance: A Primer," by Robert White, IEEE Transactions On Magnetics, Vol. 28, No. 5, September 1992, incorporated herein by reference. GMR heads may be manufactured to be about 5 times as sensitive to magnetic fields as conventional magneto resistive heads. GMR technology has also been incorporated with Spin-Valve structures that are well known in the art.

Magneto-optical (MO) media includes data bits written as up or down magnetic domains perpendicular to the surface of the media. In prior art MO disk drives, data is read as a clockwise or counter-clockwise rotation imposed on a reflected polarized laser light by the up or down orientations of the domains. The polarization rotation information requires an optical readout means for detection of the rotated polarized light. In the prior art, the means for readout includes a plurality of bulky and complex optical elements located on a magneto-optical head (U.S. Pat. No. 5,295,122). In the prior art, the optical elements typically degrade the signal to noise ratio (SNR) of the information conveyed by the polarization rotation before readout as an electronic signal. The prior art optical elements also contribute to the mass of the magneto-optical head and to the complexity of the alignment between the optical elements.

What is needed therefore is an apparatus that provides improved SNR readout for data stored with MO media and reduced mass and size of the associated magneto-optical head.

SUMMARY OF THE INVENTION

The present invention utilizes magneto-resistive technology with magneto-optical technology. The present invention provides a signal representative of data recorded on a MO disk that has an improved SNR. The present invention minimizes the return optical path optics required by the prior art and thus the mass and complexity of an optical head.

In the present invention at least one optical element is used to deliver light to a magneto-optical storage location. A current is applied to a conductor to cooperate with the light to store information at the magneto-optical storage location. In one embodiment, a flux guide enhances the storage of the information. In one embodiment, the at least one optical element includes an optical fiber and/or a steerable mirror. In the present invention, the at least one optical element is coupled to a magneto-optical head.

In one embodiment the magneto-optical storage location includes a thermally assisted storage layer. A magneto-resistive element cooperates with the light for reading information at the magneto-optical storage location. In one embodiment, the magneto-resistive element is coupled to an air-bearing surface of the magneto-optical head. Alternatively, the magneto-resistive element is coupled to a flux guide to enhance the read signal obtained from the magneto-resistive element. In one embodiment, the flux guide is coupled to an optical element within a diameter and along a bottom surface of the optical element. The magneto-resistive element may include a conventional magneto-resistive element, a giant magneto-resistive element (GMR), or a Spin valve element.

DESCRIPTION OF THE INVENTION

The present invention provides a signal representative of the data recorded on the MO disk that has an improved SNR as compared to conventional MO data readout. In doing so, the present invention eliminates the return optical path optics required by the prior art and thus the mass and complexity of an optical head.

Figure 1:
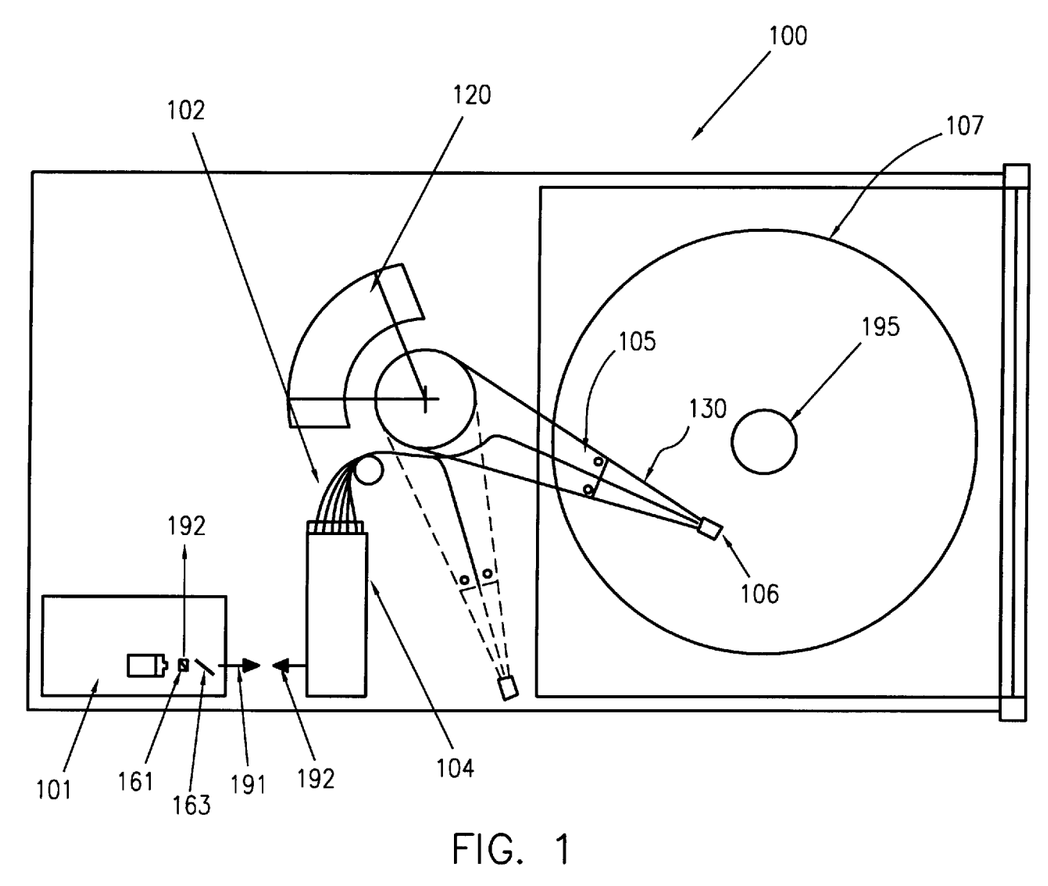
FIG. 1 is a diagram showing a magneto-optical data storage and retrieval system.

Referring in detail now to the drawings wherein similar parts of the invention are identified by like reference numerals, there is seen in FIG. 1 a diagram showing a magneto-optical data storage and retrieval system. In a preferred embodiment, a magneto-optical (MO) data storage and retrieval system 100 includes a set of Winchester-type flying heads 106 that are adapted for use with a set of double-sided MO disks 107 (only one flying head and one MO disk shown). The set of flying heads 106 (hereinafter referred to as flying MO heads) are coupled to a rotary actuator magnet and coil assembly 120 by a respective suspension 130 and actuator arm 105 so as to be positioned over upper and lower surfaces of the set of MO disks 107. In operation, the set of MO disks 107 are rotated by a spindle motor 195 so as to generate aerodynamic lift forces between the set of flying MO heads 106 and so as to maintain the set of flying MO heads 106 in a flying condition approximately 15 micro-inches above the upper and lower surfaces of the set of MO disks 107. The lift forces are opposed by equal and opposite spring forces applied by the set of suspensions 130. During non-operation, the set of flying MO heads 106 are maintained statically in a storage condition away from the surfaces of the set of MO disks 107.

System 100 further includes: a laser-optics assembly 101, an optical switch 104, and a set of optical fibers 102. The laser-optics assembly 101 includes a polarized diode laser source 231 operating an optical power sufficient for writing and reading information using the set of MO disks 107. The laser optics assembly 101 provides an outgoing laser beam 191 (with reference to laser source 231) that passes through a polarizing beam splitter 161 and quarter-wave plate 163 before entering the optical switch 104. In the exemplary embodiment, each of the set of optical fibers 102 are coupled through a respective one of the set of actuator arms 105 and suspensions 130 to a respective one of the set of flying MO heads 106. As will be discussed shortly, the system 100 is used in a configuration that, compared to the prior art, improves access to, and storage of, magneto-optical information.

Figure 2:
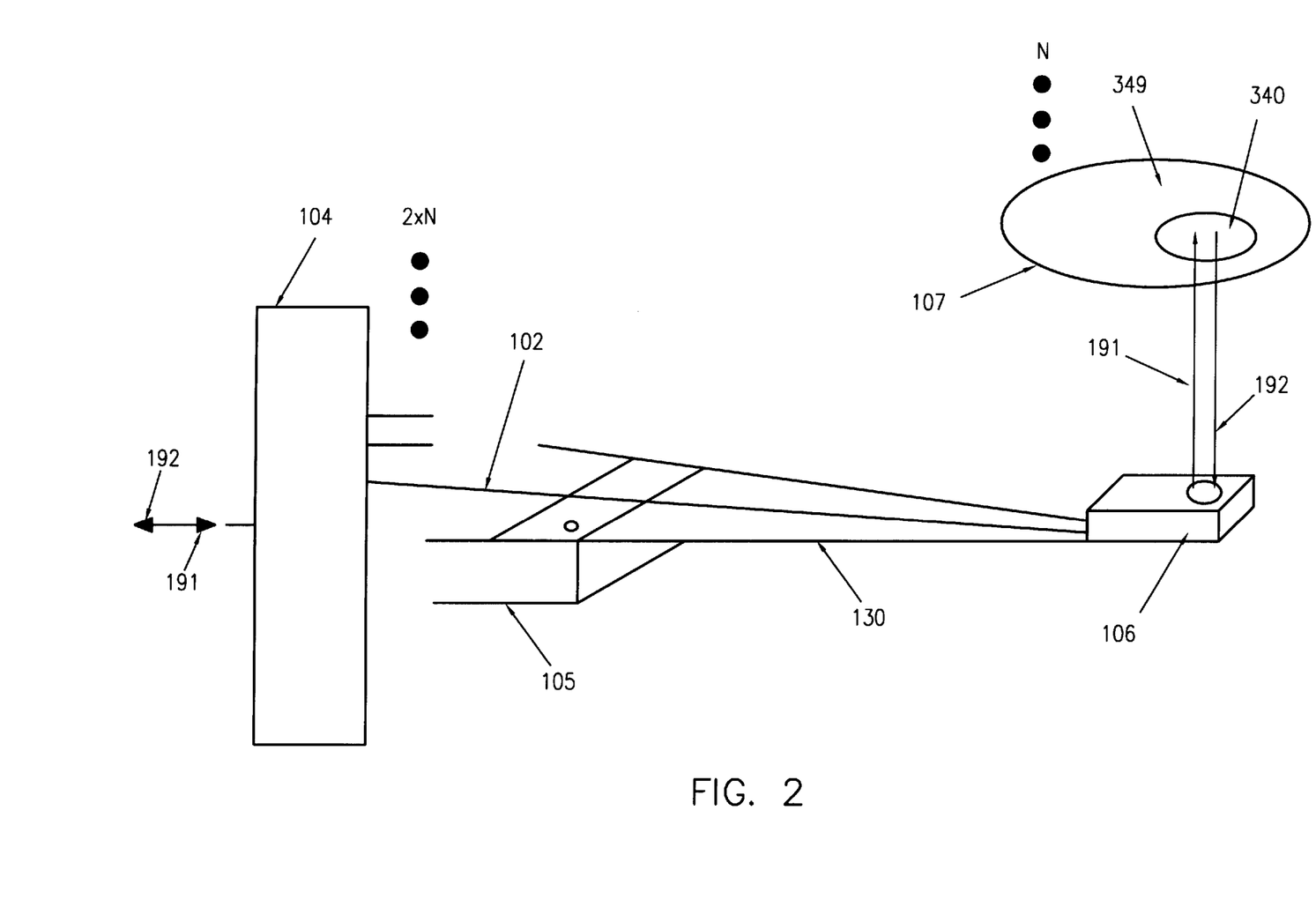
FIG. 2 is a diagram showing a representative optical path.

FIG. 2 is a diagram showing a representative optical path. In a preferred embodiment, a representative optical path is shown in FIG. 2 to include: the optical switch 104, one of the set of optical fibers 102, and one of the set of flying MO heads 106. The optical switch 104 provides sufficient degrees of selectivity for directing the outgoing laser beam 191 (with reference to laser source 231) to enter a respective proximal end of a respective optical fiber 102. The outgoing laser beam 191 is directed by the optical fiber 102 to exit the optical fiber 102 so as to pass through the flying MO head 106 onto a surface recording/storage layer 349 of a respective MO disk 107. As described below, the MO disk 107 uses magnetic super-resolution (MSR) technology.

During writing of information, the outgoing laser beam 191 is selectively routed by the optical switch 104 to the MO disk 107 so as to lower a coercivity of a recording/storage layer 349 by heating a selected spot of interest 340 to approximately the Curie point of the recording/storage layer 349. Preferably, the optical intensity of outgoing laser beam 191 is held constant, while a time varying vertical bias magnetic field is used to define a pattern of "up" or "down" magnetic domains perpendicular to the MO disk 107. This technique is known as magnetic field modulation (MFM). Subsequently, as the selected spot of interest 340 cools, information embodied in the magnetic field waveform is encoded within the recording/storage layer 349 of the respective spinning disk 107.

During track following of data tracks on the MO disk 107, the outgoing laser beam 191 is reflected from the MO disk 107 as a reflected laser beam 192 and is conveyed back by optical elements on the flying MO head 106, the optical fiber 102, and the optical switch to the laser optics assembly 101 (FIG. 1). An amplitude of the reflected laser beam 192 passes through the quarter wave plate 163 and the polarizing beam splitter 161 and is used for deriving phase change track following signals for use by conventional phase change track-following circuitry (not shown).

Figure 3A:
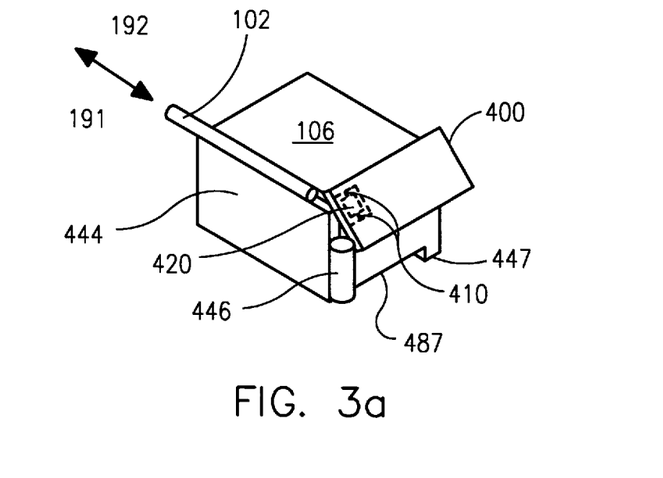
FIGS. 3a–g are diagrams showing the flying magneto-optical head of the magneto-optical data storage in a perspective, a side cross-sectional, an expanded cross-section, a side, a front, a bottom, and a rear view, respectively.

FIGS. 3a–f are diagrams showing the flying magneto-optical head of the magneto-optical data storage system in a perspective, a side cross-sectional, an expanded cross-section, a side, a front, a bottom, and a rear view, respectively. In FIG. 3a, the flying MO head 106 is shown for use above a surface recording layer 349 of one of the set of MO disks 107. The flying MO head 106 includes: a slider body 444, an air bearing surface 447, a reflective substrate 400, objective optics 446, a conductor 460, and a flux guide 462. In one embodiment, the flux guide 462 includes a permalloy flux guide. The slider body 444 is dimensioned to accommodate the working distances between the objective optics 446, the optical fiber 102, and the reflective substrate 400. The reflective substrate 400 may include a reflective surface which is aligned so as to direct the outgoing laser beam 191 to the surface recording/storage layer 349. Although, the slider body 444 may include industry standard "mini", "micro", "nano", or "pico" sliders, alternatively dimensioned slider bodies 444 may also be used. Accordingly, in the preferred embodiment, the slider body 444 comprises a mini slider height (889 um) and a planar footprint area corresponding to that of a nano slider (1600×2032 um).

The optical fiber 102 is coupled to the slider body 444 along an axial cutout 443, and the objective optics 446 is coupled to the slider body 444 along a vertical corner cutout 411. Although in the preferred embodiment the axial cutout 443 is located along a periphery of the slider body, and the vertical cutout 411 is located at a corner of the slider body 444, the axial cutout 443 and the vertical cutout 411 may be located at other positions on the flying MO head 106, for example, between the periphery and a central axis of the flying MO head 106 or, alternatively, along the central axis itself. Those skilled in the art will recognize that positioning the optical fiber 102 and the objective optics 446 at other than along a central axis may function to affect a center of mass of the flying MO 106 and, thus, its flying dynamics. Accordingly, the point of attachment of the flying MO head 106 to the suspension may require adjustment to compensate for off-center changes in the center of mass of the flying MO head 106. Preferably, the cutouts 443 and 411 may be designed as channels, v-grooves, or any other suitable means for coupling and aligning the optical fiber 102 and objective optics 446 to the flying MO head 106. In the preferred embodiment, the outgoing laser beam 191 traverses an optical path to the recording/storage layer 349 of the MO disk 107 that includes: the optical fiber 102, the reflective substrate 400, and the objective optics 446. In the preferred embodiment, the optical fiber 102 and the objective optics 446 are positioned within their respective cutouts to achieve focus of the outgoing laser beam 191 within the spot of interest 340 as a focused optical spot 448. The optical fiber 102 and the objective optics 446 may be subsequently secured in place by using ultraviolet curing epoxy or similar adhesive.

As compared to free space delivery of laser light, the optical fiber 102 provides an accurate means of alignment and delivery of the outgoing 191 laser beam to the reflective substrate 400. The optical fiber 102 also provides a low mass and low profile optical path. The low mass of the optical fiber 102 provides a method of delivering light to the optics of the flying MO head 106 without interfering substantially with the operating characteristics of the actuator arm 105 and suspension 130. The low profile of the optical fiber 102 provides the ability to reduce the distance between a set of MO disks 107 without interfering with delivery of laser light to and from the MO disks 107 and/or operation of the flying MO head 106. The optical fiber 102 also appears as an aperture of a confocal optical system for the reflected laser beam 192 and has a large depth resolution along its optical axis and an improved transverse resolution.

Figure 3B:
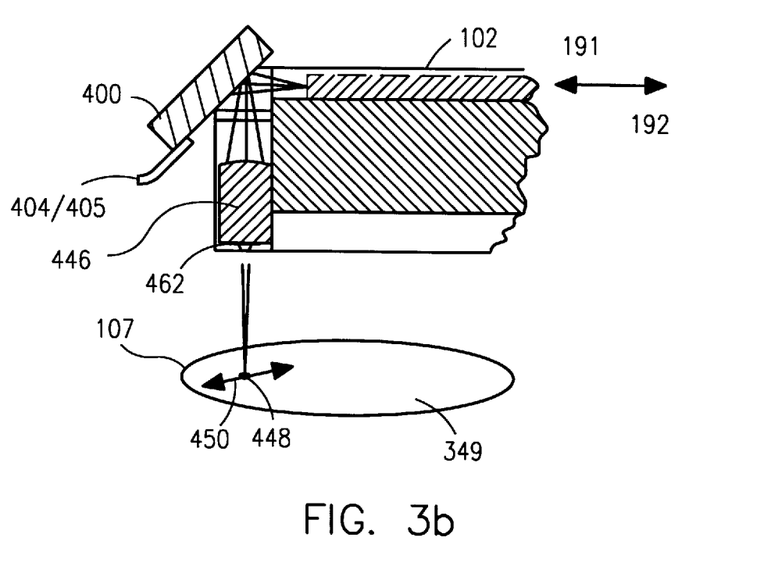

In an exemplary embodiment, the reflective substrate 400 may comprise a steerable micro-machined mirror assembly. A steerable micro-machined mirror assembly is disclosed in commonly assigned U.S. patent application Ser. No. 08/844, 207, entitled "Data Storage System Having An Improved Surface Micro-Machined Mirror," which is was filed on Apr. 18, 1997 and which incorporated herein by reference. In the preferred embodiment, the steerable micro-machined mirror assembly 400 includes a small (in one embodiment, less than 300 um square) reflective central mirror portion 420 (illustrated in FIG. 3a by dashed lines representative of the reflective central mirror portion on a side of the steerable micro-machined mirror assembly 400 opposite to that which is visible). The small size and mass of the steerable micro-machined mirror 400 contributes to the ability to design the flying MO head 106 with a low mass and a low profile. As used in the magneto-optical storage and retrieval system 100, fine tracking and short seeks to a series of nearby tracks may be performed by rotating the reflective central mirror portion 420 about a rotation axis so that the propagation angle of the outgoing laser beam 191 and the reflected laser beam 192 is changed before transmission to the objective optics 446. The reflective central mirror portion 420 is rotated by applying a differential voltage to a set of drive electrodes 404/405 (FIG. 3b). The differential voltage on the electrodes creates an electrostatic force that rotates the reflective central mirror portion 420 about a set of axial hinges 410 and enables the focused optical spot 448 to be moved in the radial direction of the MO disk 107. In the exemplary embodiment, a rotation of approximately ±2 degrees of the reflective central mirror portion 420 is used for movement of the focused optical spot 448 in an approximately radial direction 450 of the MO disk 107 (equivalent to approximately ±4 tracks) for storage of information, track following, and seeks from one data track to another data track. In other embodiments, other ranges of rotation of the reflective central mirror portion 420 are possible. Coarse tracking may be maintained by adjusting a current to the rotary actuator magnet and coil assembly 120 (FIG. 1). The track following signals used to follow a particular track of the MO disk 107 may be derived using combined coarse and fine tracking servo techniques that are well known in the art. For example, a sampled sector servo format may be used to define tracks. In the prior art, conventional multiple platter Winchester magnetic disk drives use a set of respective suspensions and actuator arms that move in tandem as one integral unit. Because each flying magnetic head of such an integral unit is fixed relative to another flying magnetic head, during track following of a particular magnetic disk surface simultaneous track following of another magnetic disk surface is not possible. In contrast, irrespective of the movement of the set of actuator arms 105 and set of suspensions 130, a set of the steerable micro-machined mirror assemblies 400 of the present invention may be used to operate independently and thus permit track following and seeks so as to read and/or write information using more than one MO disk surface at any given time. Independent track following and seeks using a set of concurrently operating steerable micro-machined assemblies 400 would preferably require a set of separate respective read channel and fine track electronics and mirror driving electronics. In the aforementioned embodiment, because delivery of the outgoing laser beam 191 would preferably require separate diode laser sources 231, an optical switch 104 for switching between each of the separate optical paths would not necessarily be required.

Figure 3C:
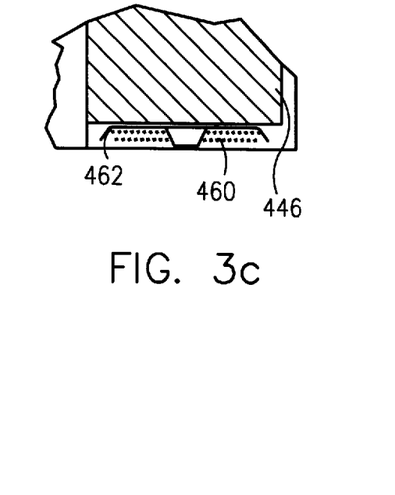
Figures 4A, 4B, 4C:
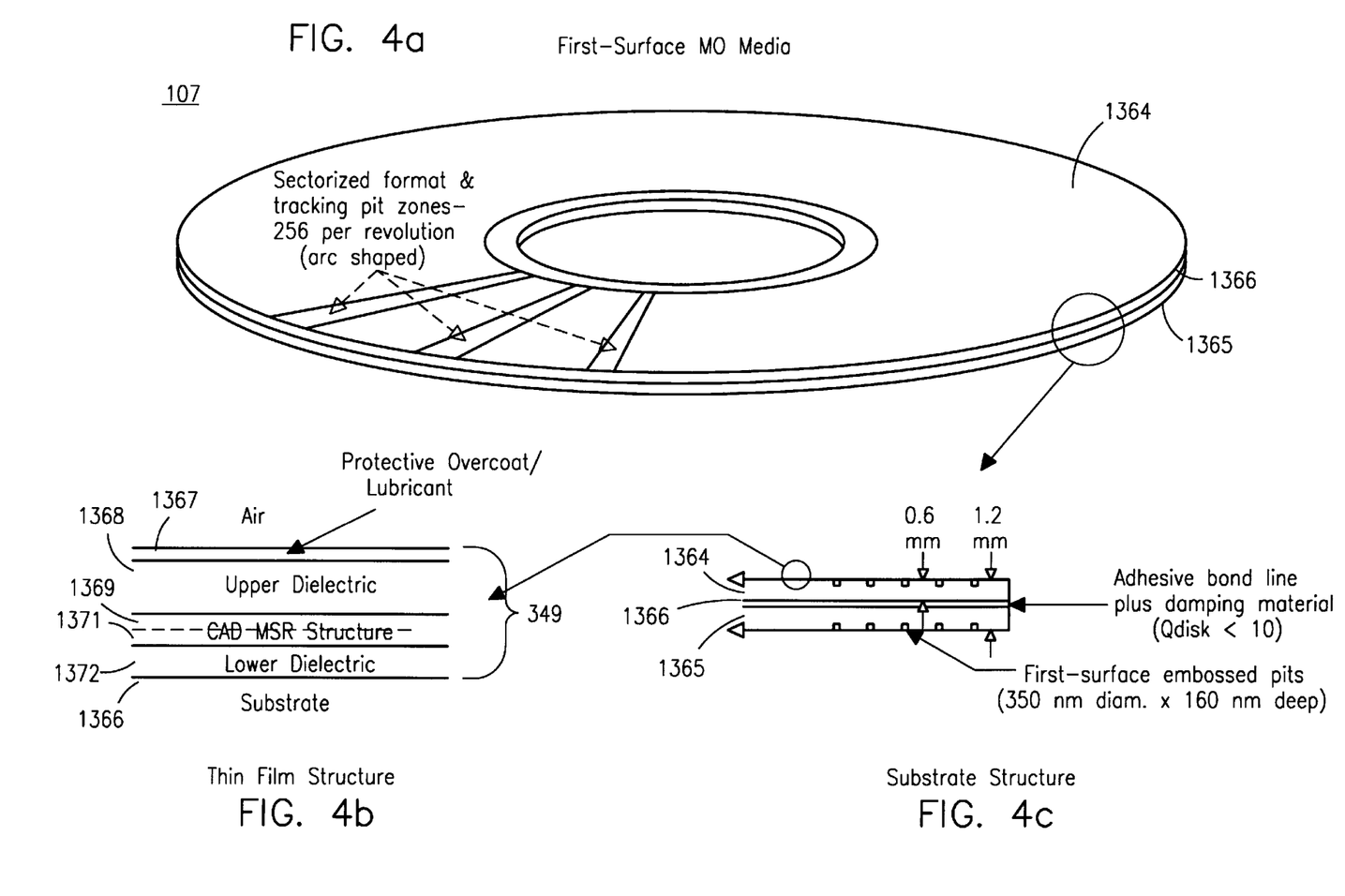
FIGS. 4a–c illustrate, a respective perspective section, side section, and exploded side section of the MO disk of the present invention.

FIGS. 4a–c illustrate, a respective perspective section, side section, and exploded side section of the MO disk of the present invention. As was discussed above, the present invention transmits light to the set of MO disks 107 using low profile and small mass optical paths. The low profile and small mass optical paths enable the present invention to use a plurality of double sided first surface MO disks 107 at a very small spacing between disks. Unlike the prior art, the double-sided first surface MO disks 107 of the present invention utilize magnetically-induced super resolution (MSR) film structures. As compared to conventional quadrilayer MO disks, an MSR film structure can support readout of at least one data domain mark within any given optical spot 448 formed by the outgoing laser beam 191 on an MO disk 107 and, preferably a plurality of data domain marks. The MO disk 107 of the present invention utilizes thermally-induced masking of written magnetic domain patterns in the MSR film structure to enable extension of the modulation transfer function of the readout optical system. In the multi-layered recording/storage layer 349 structure shown in FIGS. 4a–c, adjacent magnetic layers are coupled by an atomic exchange mechanism to form magnetic apertures, which are smaller than the optical beam size. There are several methods for selecting which magnetic domain within the illuminated area of the disk is selected and presented to the readout beam, mainly front-aperture detection (FAD), rear-aperture detection (RAD), and central-aperture detection (CAD). These methods differ in the location of the domain within the illuminated area of the disk which is selected for display to a magneto-resistive readout means discussed below. In the preferred embodiment, the CAD method is used for selection of a particular magnetic domain; however, it will be appreciated that the invention is not limited to this method. The CAD, FAD, and RAD methods are illustrated and discussed below with reference to FIG. 14 below. In these three techniques, data is written onto the storage layer 1371 with the flying MO head 106 flying close to the MO disk 107, which is modulated using the aforementioned MFM recording techniques. The dimensions of the conductor 460 and flux guide 462 (FIG. 3c) preferably do not interfere with passage of light through and to the objective optics 446. The conductor 460 and flux guide 462 also provide the ability to record a plurality of magnetic domain marks that are smaller than the optical spot 448 size at a higher recording rate and higher flux density than the prior art.

In an exemplary embodiment, the MO disk 107 is fabricated as a double sided first surface MSR media using storage layers 1364, 1365, and with embossed pits on opposing sides of a substrate 1366. Each layer preferably includes a lubricant/protective layer 1367 of a thickness approximately 3 nm. In one embodiment, the lubricant/protective layer 1367 may include a thin amorphous carbon film. Preferably, the lubricant/protective layer 1367 includes a transmittance of at least 0.95. The lubricant/protective layer preferably facilitates dynamic load and unload of the flying MO head 106 to and from the flying condition, and also supports long term stability during track-following and track seeking. The lubricant/protective layer 1367 also provides an anti-static function to keep the MO disk 107 surface resistivity below $10^{12}/\square$ ohms. The lubricant/protective layer 1367 is deposited over a silicon nitride (SiN) upper dielectric layer 1368. Although in an alternative embodiment, the lubricant/protective layer 1367 can provide a protective function, in the exemplary embodiment, the dielectric layer 1368 also serves this function. The upper dielectric layer 1368 includes a thickness typically in the range of 60–100 nm. The upper dielectric layer 1368 acts to provide a number of functions, including: (a) a hard protective coating to prevent film damage during disk handling or inadvertent head-disk contact during device operation; (b) thickness, refractive index, and thermal properties that adjust for the reflectance and Kerr effect properties of the layers below; (c) sufficient impermeability to protect and passivate the chemically active MO layers below. The upper dielectric layer 1368 is deposited over a plurality of magnetically active layers 1369 and 1371 that have a total thickness of approximately 40–100 nm. The layers 1369 and 1371 preferably function to yield a readout aperture with a read power of preferably less than approximately 3 mW. The upper layer 1369 is a read layer and is approximately 40 nm thick to preferably yield a strong Kerr effect and maximal signal-to-noise performance. In an exemplary embodiment, the upper layer 1369 is a ferrimagnetic material such as GdFeCo. In the exemplary embodiment, the lower layer 1371 is data storage layer comprised of a ferrimagnetic alloy such as DyFeCo having a thickness of approximately 40 nm. In both layers 1369 and 1371, each magnetic data domain consists of a region of the layer that is magnetized in a perpendicular direction to the surface of the MO disk 107. The upper 1369 and lower 1371 layers preferably have a low transmittance such that an optical reflective function is provided by only the layers above. This compares favorably to traditional quadrilayer MO disk media, in that, a separate reflective layer is not necessarily required. The lower layer 1371 is deposited on top of a silicon nitride dielectric layer 1372 that has a thickness of approximately 20–40 nm. The lower dielectric layer 1372 is disposed on the substrate 1366. The thickness of the various layers of the MO disk 107 are preferably selected for proper thermal behavior (appropriate power sensitivity and good temperature gradients for writing and for sharp MSR aperture formation) and for good exchange coupling.

In an exemplary embodiment, the substrate 1366 may be a single piece metal such as Aluminum Magnesium (AlMg) or, for alternatively, a plastic, a glass, a ceramic substrate, or a two-piece laminated plastic substrate. It is understood, however, that other materials for the substrate 1366 are within the scope of the present invention. The substrate 1366 should be sufficiently rigid to resist deformation when the MO disk is spun at 4500 rpm. The substrate 1366 thickness is preferably in a range of 1.20±0.05 mm. If a plastic substrate is used, a thermal heat sinking layer may be deposited directly on the substrate 1366 to control lateral heat flow, for example a metallic layer. If a metal substrate is selected, a hard overcoat such as nickel phosphorous (NiP) may be deposited on the substrate 1366 before the deposition of the dielectric layer 1372. The overcoat should have a sufficiently low thermal conductivity such that it does not degrade the writing sensitivity of the disk (i.e., elevate the writing/reading/erasing power requirement). If a plastic is selected, tracking and format information may be embossed ("hard formatting"). If a metal or glass substrate is selected, mass replicated format features (e.g., photopolymerization) may be used. Alternatively, "soft formatting" by magnetic layer writing may be used.

In an alternative exemplary embodiment, the layers 1369 and 1371 may be separated by a magnetic or non magnetic coupling layer (not shown) so as to improve exchange coupling. In another alternative exemplary embodiment, the layers 1369 and 1371 may comprise multi-layers deposited contiguously, or separated by intervening dielectric layers, depending on the interlayer magnetic coupling and resultant MSR performance desired.

Figure 5:
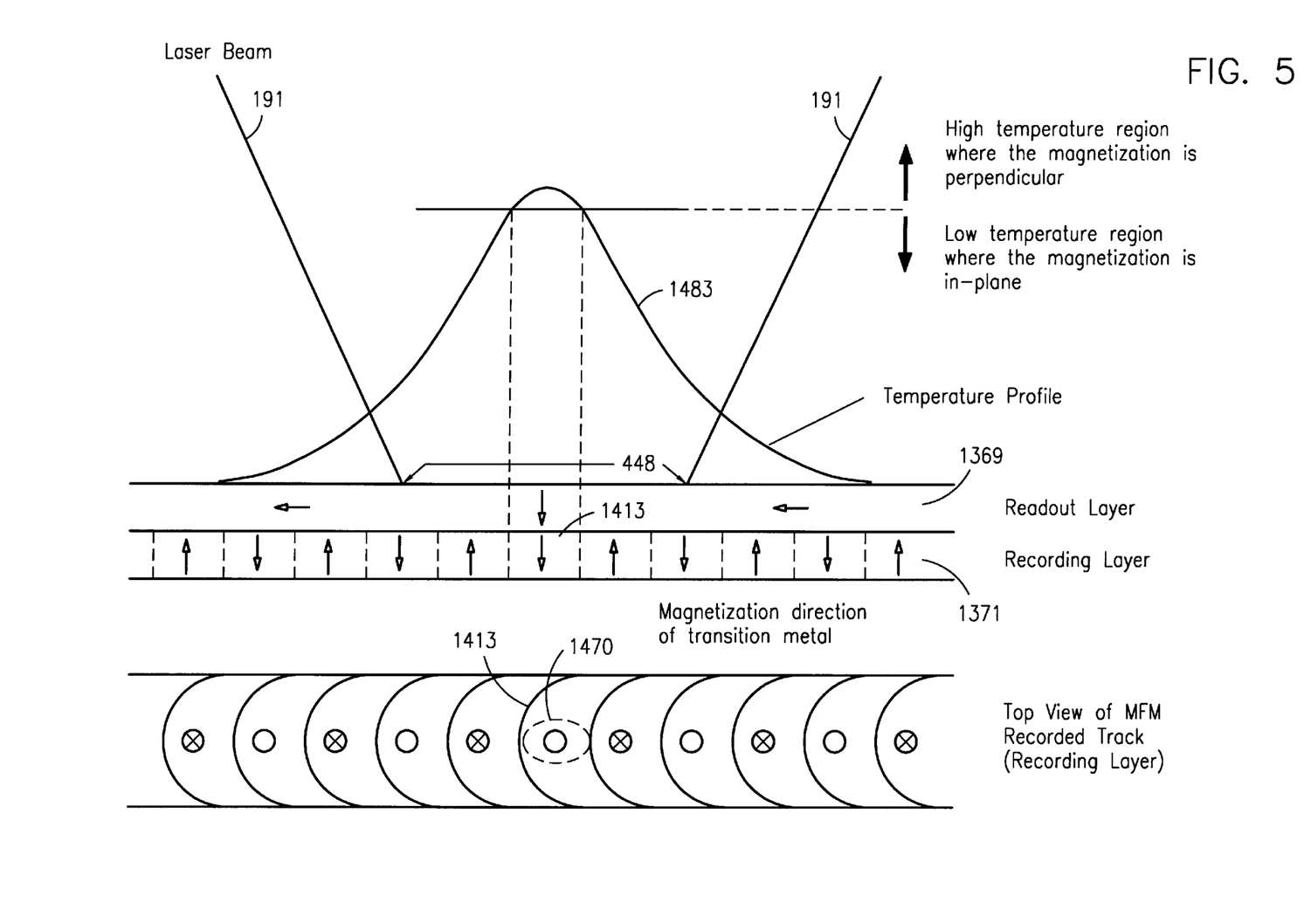
FIG. 5 illustrates a temperature profile of the CAD MSR recording method.

FIG. 5 illustrates a temperature profile of the CAD MSR recording method. With the CAD method mentioned above, MSR creates an essentially elliptically shaped aperture 1470 inside of a particular isotherm in the read layer 1369 due to an elevated temperature profile created by the outgoing laser beam 191. By carefully designing the MO film composition, stack architecture, and thickness, the temperature profile 1483 can be tailored for a desired power sensitivity as well as signal and noise performance. The aperture 1470 includes a high temperature zone in which a particular data domain mark recorded in the storage layer 1371 is copied upward to the read layer 1369. The copying is a parallel coupling of the perpendicular magnetization (to the disk plane) of a particular data domain mark 1413 in the storage layer 1371 to the magnetization of the read layer 1369. Near room temperature, no data domain marks 1413 are available for readout. During readout, when a magnetization between layers is induced by temperature elevation by application of the outgoing laser beam 191, a relatively strong vertical magnetic flux signal is available only for the data mark 1413 not masked by the aperture for the outgoing laser beam 191 incident on the read layer 1369. The CAD method is advantageous for a number of reasons, including: the aperture shape is easily controlled by the level of readout laser power (typically 2–3 mW); the aperture shape masks not only magnetization information that would otherwise interfere with the data marks to be read along the data track, but it also shields adjacent track information, thus enabling higher track and linear densities; no readout magnetic field is required; and the read layer and write layer structure is relatively simple.

The present invention identifies that the magneto-optical data storage and retrieval system 100 may achieve high SNR readout of the vertical flux field generated by the data domain marks 1413 on a MO disk 107 by taking advantage of magnetic head recording technology. This contrasts to prior art MO data readout, in which polarization rotation of a readout optical beam is used to detect the up or down orientations of the data marks stored on a conventional MO disk. The present invention further identifies that use of magneto-resistive head technology combined with MSR technology provides the ability to record and readout high data densities.

Figures 3D, 3E, 3F, 3G:
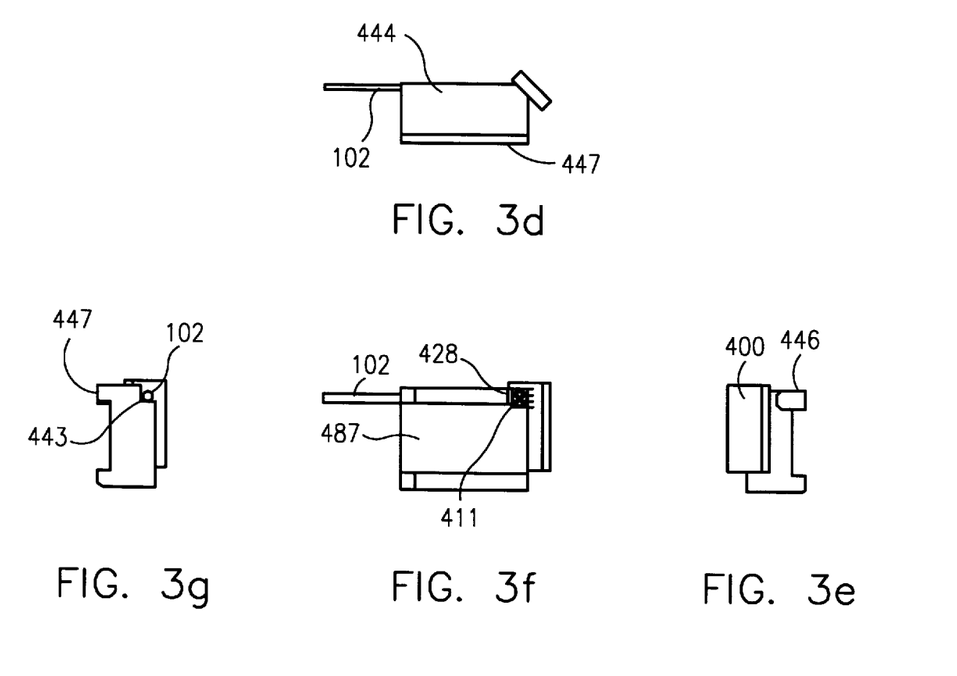
Figure 6:
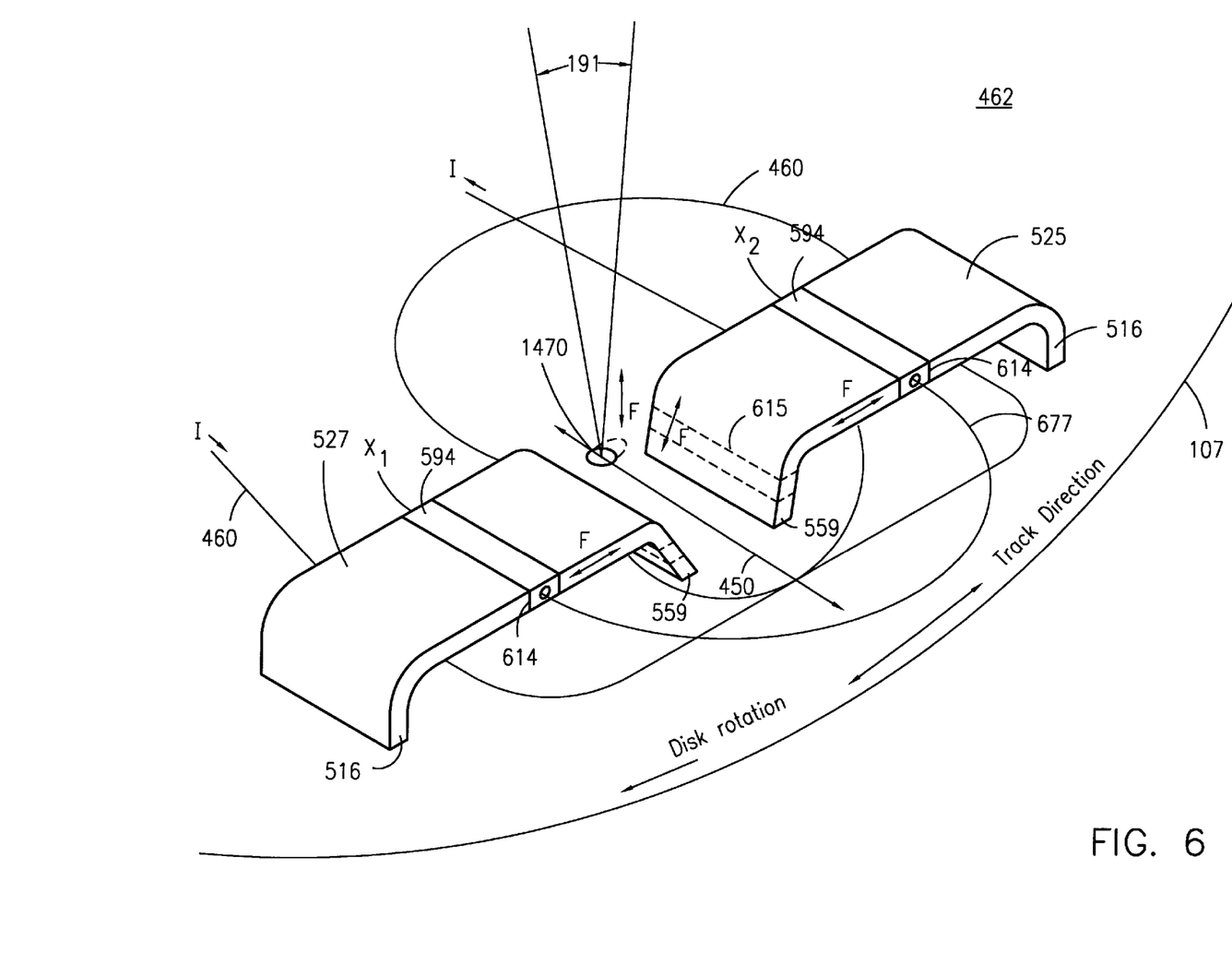
FIG. 6 is a perspective view of an embodiment of the flux guide illustrated in FIGS. 3c and 3d.

FIG. 6 is a perspective view of an embodiment of the flux guide 462 illustrated in FIGS. 3c and 3d. In one embodiment, the flux guide 462 includes a left portion 527 and a right portion 525. The left and right portions 527, 525 are each defined by a C-shaped semi-cylinder that is symmetric with respect to a generally longitudinal axis passing therethrough. The left and right portions 527, 525 each include an inner edge 559 and an outer edge 516. The left and the right portions 527, 525 are positioned such that the inner edges 559 are disposed to be approximately parallel to each other and separated by a gap of approximately 15 um. It is understood, however, that the gap may include other dimensions. The gap between the inner and outer edges 559 and 516 defines a passage through which the outgoing laser beam 191 may be scanned back and forth onto the MO disk 107 (shown as arrow 450). The C-shaped semi-cylinder defines a volume within which the conductor 460 (FIG. 3c) is disposed. It is understood, however, that the left 527 and right 525 portions may define other volumes comprising other geometries. In one embodiment, the conductor 460 is a coiled conductor (only two turns shown). A passage of current though the conductor creates a sufficient magnetic field for writing data marks 1413 at the surface of the MO disk 107. The flux guide 462 enhances the aforementioned magnetic field.

In one embodiment, the left and right portions 527, 525 each include a generally flat top portion and a generally rectangular channel 614 formed therein. In the preferred embodiment, the left and right portions 527, 525 further include a magneto-resistive element 594. In the preferred embodiment, the magneto-resistive element 594 is deposited within the channel 614 using magneto-resistive thin film and planar deposition technologies well known in the art. In one embodiment, the magneto-resistive element may include a giant magneto-resistance (GMR) element. In another embodiment, the magneto-resistance element may include a Spin Valve element. Other magneto-resistive elements are also within the scope of the present, for example, single or dual stripe magneto-resistance elements. In the preferred embodiment, the magneto-resistive element 594 includes a rectangular linear strip type design used in prior art magnetic head designs. It is understood that the magneto-resistive element 594 requires biasing (not shown) using techniques that are well known in the art. The dimensions of the magneto-resistive element 594 includes a length, a width and a height, with the width being less than the length, and the height being less than the width. During reading of data, the left and right portions 527, 525 of the flux guide 462 direct the flux formed within the MSR aperture 1470 (described above) by any particular data domain mark 1413 towards and through the magneto-resistive element 594. The magneto-resistive element 594 is preferably oriented to pass and sense the flux (F) along the width of the magneto-resistive element 594. The left and right portions are electrically connected (connection 677) such that a change in the flux F changes a series resistance of the magneto-resistive elements 594. The series resistance is sensed at a set of outputs $X_1$ and $X_2$ and is amplified by a conventional magneto-resistive preamplifier (not shown) into a signal representative of up or down orientations of the data domain marks 1413. In the embodiment illustrated in FIGS. 3c and 3b, the flux guide 462 (and therefore the magneto-resistive elements 594) are dimensioned to be of a size that may be coupled within an outer diameter (in one embodiment, 0.250 um) and lower surface of the objective optics 446. In contrast to the use of conventional magneto-resistive elements, a GMR element provides increased sensitivity to magnetic flux generated by data domain marks 1413 and, therefore, permits an increased flying height of the flying MO head 106 above the MO disk 107. It is understood that increased sensitivity to the magnetic flux generated by a particular data domain mark 1413 may be achieved by positioning the magneto-resistive element 594 at other than a top portion of the flux guide 462, for instance, within channels 615 formed more generally towards the inner 559 or outer edges 516. In an alternative embodiment, a magneto-resistive element 594 may be used only in either the left or right portions 527, 525. In the aforementioned alternative embodiment, the MSR aperture 1470 formed by the outgoing laser beam 191 may alternatively be teardropped shaped (illustrated by dashed lines) rather than elongated (the shape of the aperture being a function of the material properties of the various layers deposited on the MO disk 107). Thus, during data readout (during rotation of the MO disk 107), the MSR aperture 1470 would extend towards the magneto-resistive element 594 as the flying MO head 106 passes over the narrow tail end of the tear-dropped aperture flux emanating from a particular data domain mark of interest within the aperture. In other words the optical spot gives radial resolution and the magneto-resistive element gives circumferential resolution.

Figure 7:
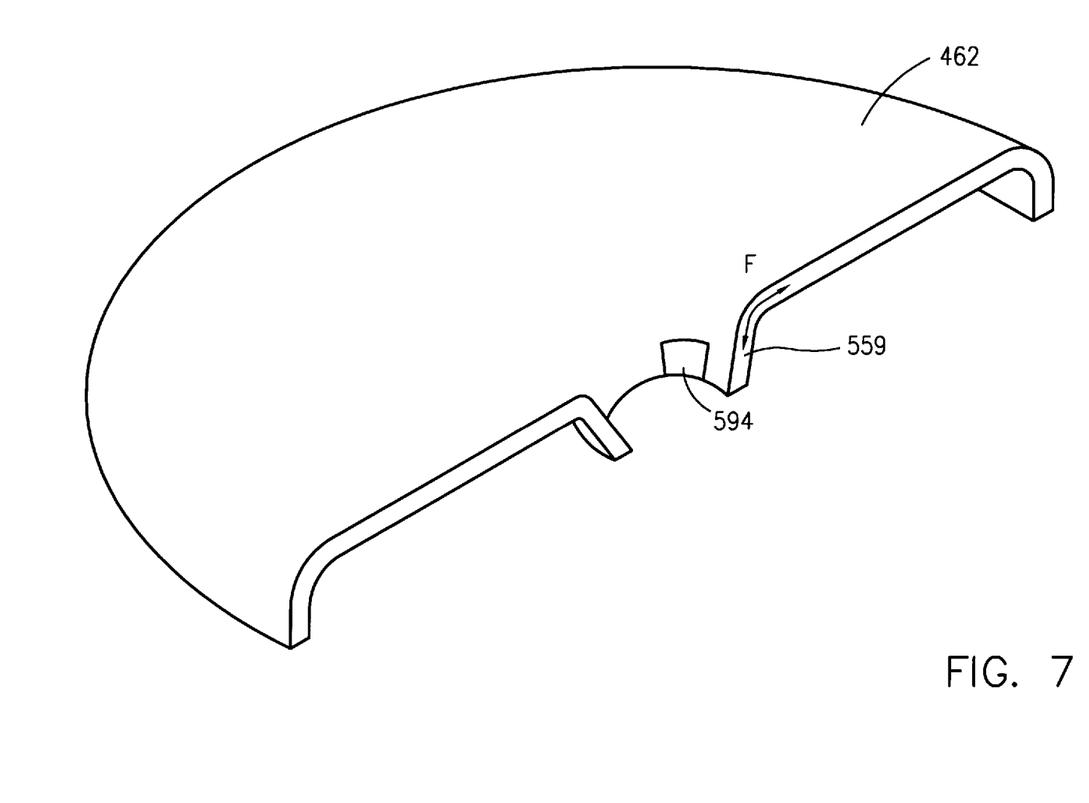
FIG. 7 illustrates the length of the magneto resistive element positioned along an airbearing surface of a head in a direction generally parallel to the scanning direction of the outgoing laser beam.

While the aforementioned description has been directed to a read/write magneto-optical system, it is understood that in a read only system a coiled conductor 460 and flux guide 462 would not be necessarily required. It is understood that in other embodiments the MO disk 107 could include other MO media structures. With position sensing patterns that are magnetically written, rather than servo pits, the present invention may be used to track follow data tracks by using the magneto-resistive element 594 with conventional magnetic head track following circuitry. In the aforementioned embodiment, a servo pattern would be pre-recorded on the MO disk 107 using techniques well known in the magnetic disk arts. It is understood that the flux guide 462 and conductor 460 (and thus the gap formed between the left portion 527 and the right portion 525) could include other geometries, for example circular, elongated, rectangular, etc. (a crossection of a circular flux guide is shown in FIG. 7). In an alternative embodiment shown in FIG. 7, the magneto-resistive element 594 is shown to be disposed along an inner tip 559 of a circular flux guide. An opposing magneto-resistive element could also be disposed in the portion of the circular flux guide not shown in a crossection. It is understood that magneto-resistive elements 594 could be disposed (as in the embodiment shown in FIG. 6) along a flat top portion of the circular flux guide 462. It is also understood that in one embodiment, the reflective substrate 400 may include a fixed reflective central mirror portion 420. In this latter embodiment, a two stage head actuator (for example, as disclosed by Horsely et al. in "Angular Micropositioner For Disk Drives, starting on Pg. 454, in IEEE Proceedings, Tenth Annual International Workshop On Micro Electro Mechanical Systems, Jan. 26–30, 1997), herein incorporated by reference, could be used to track follow a surface of a MO disk 107. In other embodiments, it is understood that a data domain marks 1413 could be written by a conductor 460 without necessarily requiring a flux guide 462 to guide the flux to the MO disk 107. In the aforementioned embodiment, the magneto-resistive element 594 could be disposed within a channel 428 (FIG. 3f) along the air bearing surface 447 of the flying MO head 106. It is further understood that if a laser diode laser source 231 were to be located on each of the set of MO heads 107, the optical fibers 102 and the optical switch 104 would not necessarily be required.

Thus, while the present invention has been described herein with reference to particular embodiments thereof, a latitude of modification, various changes and substitutions are intended in the foregoing disclosure, and it will be appreciated that in some instances some features of the invention will be employed without a corresponding use of other features without departure from the scope of the invention as set forth.

What is claimed is:

1. An assembly for accessing data bits in storage locations on a succession of radially separated tracks on a rotating multilayer, MSR disc comprising a storage layer and a readout layer:

a slider flyable over a surface of said disc, said slider supporting
      at least one optical element coupled to said assembly, said optical element directing light to a region of said disc including one or mote of said storage locations, said optical element comprising an optical fiber and a micro-machined mirror supported on said slider and adapted to direct said light to storage locations on said recoding layer of said disc;
   a conductive coil coupled to and supported on said assembly, wherein a passage of current through said conductive coil is sufficient to establish a magnetic field which is coupled to said disc and in cooperation with said light stores information at one of said storage locations on said storage layer; and
   a magneto-resistive element coupled to said assembly, said magneto-resistive element cooperating with said light which illuminates and heats a plurality of said storage regions of said disc along one said track of said disc said magneto-resistive element sensing one of said bits from said readout layer at said storage location.

2. An assembly as claimed in claim 1 wherein said optical element comprises means for illuminating and heating a plurality of storage locations along one track of said recording layer of said disc, said light being provided by a light source comprising a laser.

3. An assembly as claimed in claim 2 wherein said optical fiber is supported on a surface of said slider.

4. An assembly as claimed in claim 2 wherein said micro-machined mirror is supported from said slider adjacent an output end of said fiber and reflects said light from said fiber to a path substantially perpendicular to said disc while being capable of moving said light radially over a track on said disc.

5. An assembly as claimed in claim 2 wherein said readout layer is responsive to heating by said light carried by said optical element to copy a data bit from one of said storage locations in said recording layer to a readable location in said readout layer.

6. An assembly as claimed in claim 5 wherein said magneto-resistive element reads said data bit from said readout layer of said disc.

7. An assembly as in claim 1 wherein said MSR disc is two-surfaced, comprising a recording layer and a readout layer facing each said surface, and compress a flying slider facing each said surface of said disc.

8. An assembly as in claim 1 wherein said light illuminates magnetic domain marks in said storage location disposed along a single track of a plurality of tracks on said disc.

9. An assembly as claimed in claim 1 wherein said storage layer is a thermally assisted layer capable of storing information only when heated above a Curie temperature established by material characteristics of said storage layer.

10. An assembly as claimed in claim 1 wherein a source of said light is a laser which is directed to said spot on said recording layer to heat said spot to about the Curie point of the recording layer.

11. An assembly as claimed in claim 10 wherein during recording the optical intensity of the laser is held constant while a time-varying vertical bias magnetic field defines a pattern of an up or down magnetic domain perpendicular to the MO disc.

12. An assembly as claimed in claim 11 is rotated about an axis to move said focused optical spot in the radial direction of said disc.

13. An assembly as claimed in claim 12 when said light forms a spot on said surface of said disc, said disc comprising said storage layer and said readout layer, said spot being adapted to illuminate a plurality of information storage domains along the single track of said storage layer of said disc without illuminating adjacent tracks, said spot heating said storage layer to a sufficient temperature to couple perpendicular magnetization of a particular data domain mark in the storage layer to said readout layer where said mark may be read by said magneto-resistive element.

\* \* \* \* \*

UNITED STATES PATENT AND TRADEMARK OFFICE
CERTIFICATE OF CORRECTION

PATENT NO.    : 5,889,641
DATED         : March 30, 1999
INVENTOR(S)   : BELSER et al.

It is certified that error appears in the above-indentified patent and that said Letters Patent is hereby corrected as shown below:

On the title page, "Attorney, Agent, or Firm-- Flehr Hohbach Test Albritton & Herbert LLP" add --, Mark Wardas--.

Column 1, line 3, after the title of the invention insert --This application claims the benefit of U.S. Provisional Application Serial No. 60/044,622 filed April 18, 1997, entitled "A Magneto-Resistive Magneto-Optical Head".--

Column 10, line 35, after "layer" insert --, said assembly comprising--.

Signed and Sealed this

Fourteenth Day of March, 2000

Attest:

Q. TODD DICKINSON

Attesting Officer

Commissioner of Patents and Trademarks